No. 78,063.

PATENTED MAY 19, 1868.

D. T. CONDE.
SAD IRON HOLDER.

Witnesses
J. C. Smith
A. S. Cushman

Inventor
John T. Conde
Chipman Hosmer & Co.
Attys

United States Patent Office.

DANIEL T. CONDE, OF BELOIT, WISCONSIN.

Letters Patent No. 78,063, dated May 19, 1868.

IMPROVED SAD-IRON HOLDER.

*The Schedule referred to in these Letters Patent and making part of the same.*

TO ALL WHOM IT MAY CONCERN:

Be it known that I, DANIEL T. CONDE, of Beloit, in the county of Rock, and State of Wisconsin, have invented a new and valuable Improvement in Sad-Iron Holders; and I do hereby declare that the following is a full, clear, and exact description of the construction and operation of the same, reference being had to the annexed drawings, making a part of this specification, and to the letters and figures of reference marked thereon.

The object of my invention is to provide better means than have heretofore been known or used for handling sad-irons when the same are heated.

Figure 1 of the drawings is a sectional view of my device,

Figure 1:
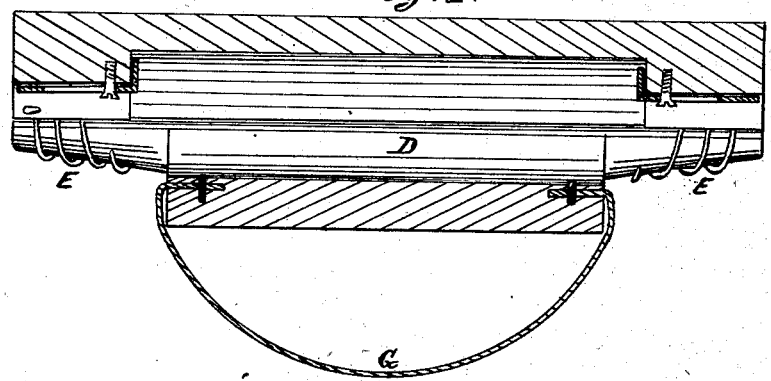
Figure 3:
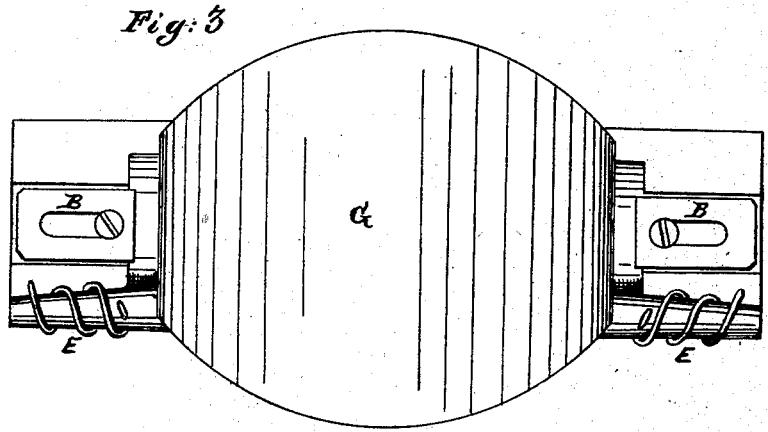
Figure 3 is a view of the lower side thereof.
Figure 2:
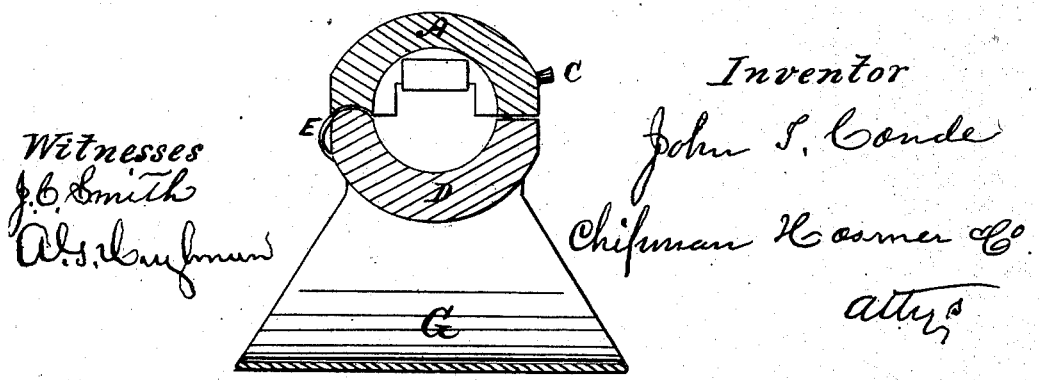
Figure 2 is a cross-section.

The letter A is a representation of the lid or extreme upper part of my holder. It is made hollow, as shown on fig. 2, to receive the upper side of the sad-iron handle, and has shoulders at each end, between which said handle is held.

Letters B are two adjustable pieces of iron, slotted and screwed as shown, the office of which is to be moved and fastened at any desirable point longitudinally, in order to adapt the hollow in the holder to the length of the sad-iron handle.

Letter C is a small pin fastened in the lid A, to facilitate the raising of the same.

Letter D is the lower part of the holder. It is hollowed to receive the lower side of the sad-iron handle, and is united to the lid A by means of coiled-wire springs marked E. These springs E are adjusted in the manner shown, and serve to keep the two parts of the holder firmly held together when the same are not held asunder by actual force.

Letter G is a shield attached to the lower side of the holder in the manner shown, and serves to keep the heat from the sad-iron from the operator's hand while the sad-iron is in use.

My device is operated as follows: I place the thumb of the right hand on the pin C, and thereby raise the lid. I then clasp the sad-iron handle between the upper and lower parts of the holder, and I am ready for work. If the sad-iron handle be too short for the hollow, I move the slotted irons B, and thereby adjust the length of said hollow to the length of said handle. The shield G always serves to keep the operator's hand from being heated by the iron. I prefer to make the holder proper of wood, and thereby save the heat of the handle from burning the hand. The shield is of metal.

I do not claim that the hinged holder and shield herein shown and described are new, either separately or in combination.

What I claim as my invention, and desire to secure by Letters Patent, is—

A sad-iron holder, having lid A, adjustable irons B, pin C, bottom D, springs E, and shield G, adjusted, combined, and arranged substantially as specified.

DANIEL T. CONDE.

Witnesses:
E. N. CLARK,
S. L. JUDD.